(12) United States Patent
Tong et al.

(10) Patent No.: US 12,069,483 B2
(45) Date of Patent: Aug. 20, 2024

(54) METHOD FOR PROCESSING BSS COLOR COLLISION, STATION, WIRELESS ACCESS POINT AND SYSTEM

(71) Applicant: TP-Link Corporation Limited, Hong Kong (CN)

(72) Inventors: Di Tong, Guangdong (CN); Changqiang Wu, Guangdong (CN)

(73) Assignee: TP-Link Corporation Limited, Hong Kong (CN)

( * ) Notice: Subject to any disclaimer, the term of this patent is extended or adjusted under 35 U.S.C. 154(b) by 71 days.

(21) Appl. No.: 18/075,469

(22) Filed: Dec. 6, 2022

(65) Prior Publication Data
US 2023/0189005 A1   Jun. 15, 2023

(30) Foreign Application Priority Data
Dec. 14, 2021  (CN) .......................... 202111524562.2

(51) Int. Cl.
*H04W 16/10*   (2009.01)
(52) U.S. Cl.
CPC .................................. *H04W 16/10* (2013.01)
(58) Field of Classification Search
CPC ...... H04W 16/10; H04W 84/12; H04W 16/02
See application file for complete search history.

(56) References Cited

U.S. PATENT DOCUMENTS

| | | | |
|---|---|---|---|
| 10,397,928 B1 | 8/2019 | Hahn et al. | |
| 10,880,750 B2* | 12/2020 | Malichenko | H04W 16/10 |
| 2017/0367129 A1* | 12/2017 | Yang | H04W 24/02 |
| 2018/0220368 A1* | 8/2018 | Gidvani | H04W 76/12 |
| 2018/0242362 A1* | 8/2018 | Kim | H04W 24/10 |
| 2019/0028898 A1* | 1/2019 | Ko | H04W 52/34 |
| 2019/0327741 A1* | 10/2019 | Li | H04W 74/002 |
| 2020/0053634 A1* | 2/2020 | Patwardhan | H04W 24/08 |
| 2020/0059932 A1 | 2/2020 | Hahn et al. | |
| 2021/0360479 A1* | 11/2021 | Dakshinkar | H04W 88/10 |
| 2021/0360691 A1* | 11/2021 | Haider | H04W 74/0808 |
| 2021/0385220 A1* | 12/2021 | Beaudin | H04W 12/08 |
| 2022/0255693 A1* | 8/2022 | Lou | H04L 27/2613 |
| 2022/0303780 A1* | 9/2022 | Koruthu | H04W 24/02 |
| 2023/0054755 A1* | 2/2023 | Patil | H04W 76/15 |
| 2023/0056930 A1* | 2/2023 | Vig | H04W 76/11 |

(Continued)

FOREIGN PATENT DOCUMENTS

| | | |
|---|---|---|
| CN | 108012278 A | 5/2018 |
| CN | 110831242 A | 2/2020 |

(Continued)

*Primary Examiner* — Mehmood B. Khan
(74) *Attorney, Agent, or Firm* — Samson G. Yu

(57) ABSTRACT

The present disclosure discloses a method for processing a basic service set (BSS) color collision, a station, a wireless access point and a system. The method includes: firstly, a station analyzes an obtained high efficiency physical layer protocol data unit (HE PPDU) to obtain a current BSS color and a current BSS identifier (BSSID), in a case that a matching result of a spatial reuse parameter field, the current BSS color and the BSSID is a BSS color collision, the station generates a collision report, and sends the collision report to the wireless access point, and finally, the wireless access point correct the spatial reuse parameter field according to the collision report.

6 Claims, 4 Drawing Sheets

A station receives and analyzes a HE PPDU to obtain a current BSS color and a current BSSID — S1 when a matching result of the current BSS color, the current BSSID and a preset spatial reuse parameter field is a BSS color collision, the station generates a collision report, where the spatial reuse parameter field includes a spatial reuse color set field and a spatial reuse address set field — S2 the station sends the collision report to a wireless access point, so as to make the wireless access point correct the spatial reuse parameter field — S3

(56) References Cited

U.S. PATENT DOCUMENTS

| | | | | |
|---|---|---|---|---|
| 2023/0105571 | A1* | 4/2023 | Mohamed Kasim | H04W 48/16 |
| | | | | 370/329 |
| 2023/0163808 | A1* | 5/2023 | Lou | H04W 74/002 |
| | | | | 455/101 |
| 2023/0379109 | A1* | 11/2023 | Chun | H04L 27/2602 |
| 2023/0413062 | A1* | 12/2023 | Park | H04L 5/0023 |
| 2024/0073948 | A1* | 2/2024 | Park | H04W 74/0866 |
| 2024/0106585 | A1* | 3/2024 | Lou | H04L 5/0023 |

FOREIGN PATENT DOCUMENTS

| | | | | | |
|---|---|---|---|---|---|
| CN | 110868729 | A | | 3/2020 | |
| CN | 111510936 | A | | 8/2020 | |
| CN | 114374995 | B | * | 10/2023 | ........... H04W 16/10 |
| EP | 3611953 | A1 | | 2/2020 | |
| EP | 3932133 | B1 | * | 9/2023 | ........... H04B 7/0617 |
| WO | WO-2024037113 | A1 | * | 2/2024 | ........... H04W 24/08 |

* cited by examiner

Fig. 2
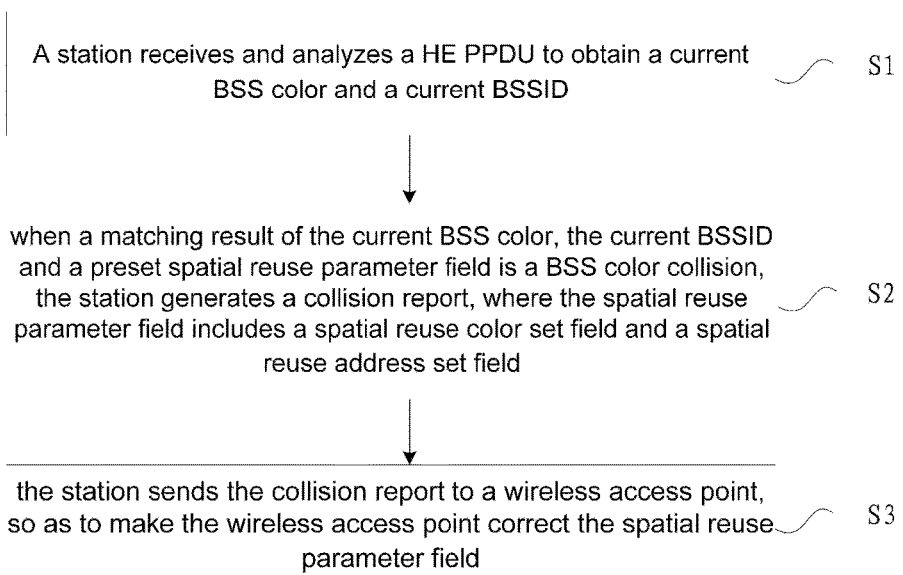
Fig. 3
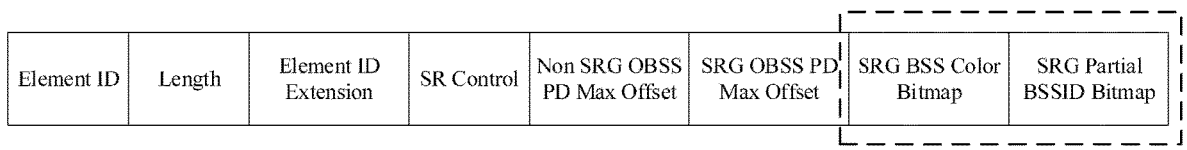
Fig. 4

METHOD FOR PROCESSING BSS COLOR COLLISION, STATION, WIRELESS ACCESS POINT AND SYSTEM

CROSS-REFERENCE TO RELATED APPLICATION

The present disclosure claims the priority of Chinese Patent Application No. 202111524562.2, filed on Dec. 14, 2021, and entitled "method for processing BSS color collision, station, wireless access point and system", which is appended herein by reference in its entirety.

TECHNICAL FIELD

The present disclosure relates to the technical field of computers, in particular to a method for processing a BSS color collision, a station, a wireless access point and a system.

BACKGROUND

In a wireless local area network, at least one station (STA) and a wireless access point (WAP) form a basic service set (BSS), the STA is connected to the WAP, a spatial reuse (SR) technology is proposed in the 802.11ax protocol, and the BSS is identified by using a BSS color, to avoid unnecessary signal interference between adjacent BSSs. In order to further improve the granularity of the spatial reuse, the 802.11ax protocol further defines a spatial reuse group (SRG) and a non-spatial reuse group (non-SRG), BSSs are divided into two types of SRG and non-SRG, and for the two types of BSSs, different packet detect (PD) thresholds are set for spatial reuse management of a physical layer protocol data unit (PPDU).

However, in a WAP-intensive location, it is highly likely that a SRG member and a non-SRG member use the identical BSS color, resulting in that the PPDU of the non-SRG member is misidentified as the PPDU of the SRG member. In this way, using a PD threshold corresponding to the SRG member for spatial reuse will cause a data transmission collision, and then reduce the performance of the wireless local area network.

SUMMARY

An embodiment of the present disclosure provides a method for processing a BSS color collision. The method includes:

a station receives and analyzes a high efficiency physical layer protocol data unit (HE PPDU), so as to obtain a current BSS color and a current BSS identifier (BSSID);

in a case that a matching result of the current BSS color, the current BSSID and a preset spatial reuse parameter field is a BSS color collision, the station generates a collision report, where the spatial reuse parameter field includes a spatial reuse color set field and a spatial reuse address set field; and the station sends the collision report to a wireless access point, so as to make the wireless access point correct the spatial reuse parameter field.

Alternatively, in a case that the matching result of the current BSS color, the current BSSID and the preset spatial reuse parameter field is the BSS color collision, the step of generating, by the station, the collision report, includes:

in a case that one piece of BSS color information in the spatial reuse color set field matches the current BSS Color and any piece of partial BSSID information in the spatial reuse address set field does not match the current BSSID, the station determines that the BSS color collision occurs between a spatial reuse group (SRG) member and a non-spatial reuse group (non-SRG) member, and generates the collision report; where the spatial reuse color set field includes the BSS color information of all the SRG members, and the spatial reuse address set field includes the partial BSSID information of all the SRG members.

Alternatively, the wireless access point deletes the current BSS color information from the spatial reuse color set field according to the collision report, so as to correct the spatial reuse parameter field, the collision report being a report generated according to the current BSS color by the station.

Alternatively, the spatial reuse parameter field is sent by the wireless access point.

An embodiment of the present disclosure further provides another method for processing a BSS color collision. The method includes:

a wireless access point sends a preset spatial reuse parameter field to a station, so as to make the station generate a collision report in a case that a matching result of a current BSS color, a current BSSID and the preset spatial reuse parameter field is a BSS color collision, where the current BSS color and the current BSSID are obtained by analysis of the station according to a received HE PPDU, and the spatial reuse parameter field includes a spatial reuse color set field and a spatial reuse address set field; and the wireless access point receives the collision report, and corrects the spatial reuse parameter field according to the collision report.

Alternatively, the matching result is the BSS color collision in a case that one piece of BSS color information in the spatial reuse color set field matches the current BSS color and any piece of partial BSSID information in the spatial reuse address set field does not match the current BSSID; where the spatial reuse color set field includes the BSS color information of all SRG members, and the spatial reuse address set field includes the partial BSSID information of all SRG members.

Alternatively, correcting the spatial reuse parameter field according to the collision report specifically, includes:

the wireless access point deletes the current BSS color information from the spatial reuse color set field according to the collision report, the collision report is a report generated according to the current BSS color.

In order to achieve the above objective, an embodiment of the present disclosure further provides a station. The station includes:

an identifier information obtaining module configured to receive and analyze a HE PPDU to obtain a current BSS color and a current BSSID;

a collision report generation module configured to generate a collision report in a case that a matching result of the current BSS color, the current BSSID and a preset spatial reuse parameter field is a BSS color collision, where the spatial reuse parameter field includes a spatial reuse color set field and a spatial reuse address set field; and a collision report sending module configured to send the collision report to a wireless access point, so as to make the wireless access point correct the spatial reuse parameter field.

In order to achieve the above objective, an embodiment of the present disclosure further provides a wireless access point. The wireless access point includes:

a parameter sending module configured to send a preset spatial reuse parameter field to a station, so as to make the station generate a collision report in a case that a matching result of a current BSS color, a current BSSID and the preset spatial reuse parameter field is a BSS color collision, where the current BSS color and the current BSSID are obtained by analysis of the station according to a received HE PPDU, and the spatial reuse parameter field includes a spatial reuse color set field and a spatial reuse address set field; and a parameter correction module configured to receive the collision report and correct the spatial reuse parameter field according to the collision report.

In order to achieve the above objective, an embodiment of the present disclosure further provides a method for processing a BSS color collision. The method includes the station and the wireless access point according to the above embodiments.

BRIEF DESCRIPTION OF THE DRAWINGS

FIG. 2 is a flowchart of a method for processing a BSS color collision according to an embodiment of the present disclosure;

FIG. 3 is a schematic diagram of a spatial reuse parameter field according to an embodiment of the present disclosure;

FIG. 4 is a schematic diagram of a data format of a collision report according to an embodiment of the present disclosure;

DETAILED DESCRIPTION OF THE EMBODIMENTS

The technical solutions of embodiments of the present disclosure will be described below clearly and comprehensively in conjunction with accompanying drawings of the embodiments of the present disclosure. Apparently, the embodiments described are merely some embodiments rather than all embodiments of the present disclosure. Based on the embodiments of the present disclosure, other various embodiments obtained by those of ordinary skill in the art without making creative efforts fall within the scope of protection of the present disclosure.

First, the case of a BSS color collision in an embodiment of the present disclosure is described.

In a spatial reuse technique of 802.11ax, the BSS includes spatial reuse group (SRG) members and non-SRG members. Different packet detect (PD) thresholds are set for the SRG members and the non-SRG members. The PD thresholds set for the SRG members may be more aggressive and may ignore physical layer protocol data units (PPDU) (including non-HE PPDU and a HE PPDU) from the SRG members with greater probability. For a station (STA), after receiving a PPDU of a non-SRG member which is mistakenly identified as a PPDU of an SRG member, a larger PD threshold is used for detection, such that this transmission may ignored with greater probability and the data transmission of the station itself may be carried out, which causes a data transmission collision, and reduces the performance of a wireless local area network.

Figure 1:
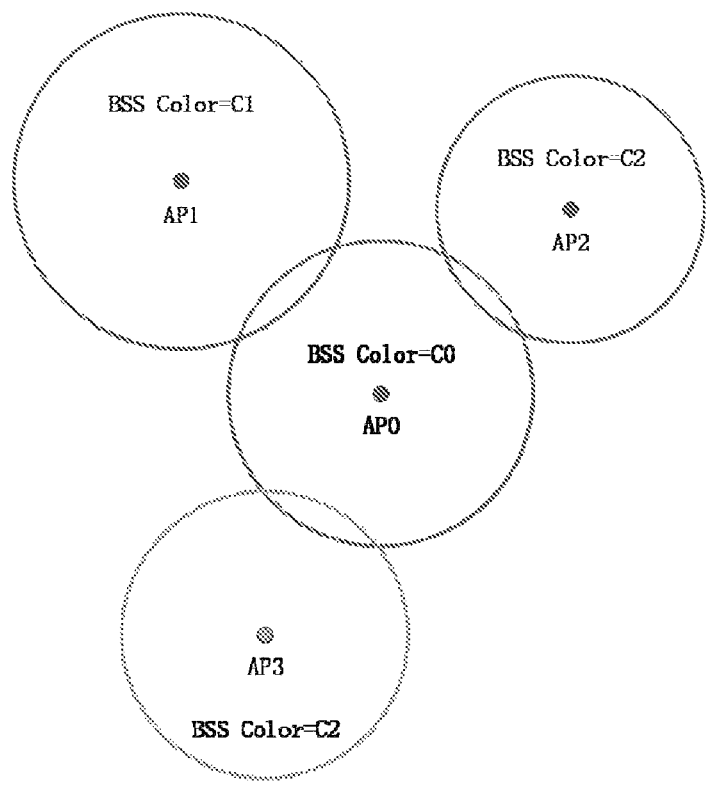
FIG. 1 is a topological diagram of a wireless network according to an embodiment of the present disclosure.

For example, in conjunction with FIG. 1, four BSSs are provided and include a BSS in which wireless access point 0 (AP0) is located (BSS color=C0), a BSS in which AP1 is located (BSS color=C1), a BSS in which AP2 is located (BSS color=C2), and a BSS in which AP3 is located (BSS color=C2), where the BSS in which AP1 is located and the BSS in which AP2 is located are SRG members of the BSS in which AP0 is located, and the BSS in which AP3 is located is a non-SRG member of the BSS in which AP0 is located. Since the BSS in which AP3 is located and the BSS in which AP2 is located use one BSS color, for the STA in the BSS in which AP0 is located, after receiving the PPDU from the BSS in which AP3 is located, the STA may ignore this transmission by using a PD threshold corresponding to a preset SRG member and perform its own transmission, and then a data transmission collision may occur in a great probability.

With reference to FIG. 2, an embodiment of the present disclosure provides a method for processing a BSS color collision. The method includes:

S1, a station receives and analyzes a high efficiency physical layer protocol data unit (HE PPDU) to obtain a current BSS color and a current BSS identifier (BSSID);

S2, when a matching result of the current BSS color, the current BSSID and a preset spatial reuse parameter field is a BSS color collision, the station generates a collision report, where the spatial reuse parameter field includes a spatial reuse color set field and a spatial reuse address set field; and S3, the station sends the collision report to a wireless access point, so as to make the wireless access point correct the spatial reuse parameter field.

Specifically, an execution subject of S1-S3 is a station (STA). Any one of devices accessing a wireless access point (WAP) may be referred to as a station, for example, a terminal device such as a laptop computer and a mobile phone. HE PPDU represents a high efficiency physical layer protocol data unit. BSSID is an identifier of a basic service set (BSS) to identify different BSSs.

It is worth explaining that two types of the matching results of the current BSS color, the current BSSID and the spatial reuse parameter field are provided, including a BSS color collision and a BSS color non-collision. When the matching result is the BSS color non-collision, no processing may be carried out. A physical layer protocol data unit (PPDU) includes an HE PPDU and a non-HE PPDU, where only the HE PPDU contains a BSS color.

The method for processing a BSS color collision according to the embodiment of the present disclosure is used for a station. A HE PPDU is received and analyzed to obtain a current BSS color and a current BSSID, when a matching result of the current BSS color, the current BSSID and a spatial reuse parameter field is a BSS color collision, a collision report is generated and sent to the wireless access point, to make the wireless access point correct the spatial reuse parameter field, so as to detect the BSS color collision and solve this collision, and further to avoid a reduction in performance of a wireless local area network.

In an implementation mode, S2 that when the matching result of the current BSS color, the current BSSID and the preset spatial reuse parameter field is the BSS color collision, the station generates the collision report specifically includes:

when one piece of BSS color information in the spatial reuse color set field matches the current BSS Color, and any piece of partial BSSID information in the spatial reuse address set field does not match the current BSSID, the station determines that the BSS color collision occurs between a spatial reuse group (SRG) member and a non-spatial reuse group (non-SRG) member, and generates the collision report; where the spatial reuse color set field includes the BSS color information of all the SRG members, and the spatial reuse address set field includes the partial BSSID information of all the SRG members.

Specifically, the spatial reuse parameter field includes a spatial reuse color set field (SRG BSS Color Bitmap) and a spatial reuse address set field (SRG Partial BSSID Bitmap). The spatial reuse color set field records the BSS color information of all SRG members of the current BSS. The spatial reuse address set field contains the partial BSSID information of all SRG members of the current BSS. For example, with reference to a schematic diagram of a spatial reuse parameter field as shown in FIG. 3, the spatial reuse color set field is bitmap information recording colors used by a SRG member. The spatial reuse color set field is an 8-byte field having 64 bits in total, and each bit indicates one color, that is, each bit of the bitmap corresponds to one of 64 BSS color values (0-63). For example, the lowest numbered bit in the bitmap corresponds to the BSS color value 0, and the highest numbered bit corresponds to the BSS color value 63. When the value of a certain bit in the bitmap is 0, it is indicated that the BSS color corresponding to the bit does not belong to the BSS color of the SRG member, and when the value of a certain bit in the bitmap is 1, it is indicated that the BSS color corresponding to the bit belongs to the BSS color of the SRG member. In practical application, the bit corresponding to the BSS color value 0 in the bitmap is reserved. The spatial reuse address set field is bitmap information recording partial BSSID information of all SRG members of the current BSS. The spatial reuse address set field is an 8-byte field having 64 bits in total, and each bit is used for indicating one partial BSSID, that is, each bit of the bitmap corresponds to one of 64 partial BSSID values (0-63). For example, the lowest numbered bit in the bitmap corresponds to the partial BSSID value 0, and the highest numbered bit in the bitmap corresponds to the partial BSSID value 63. When the value of a certain bit in the bitmap is 0, it is indicated that the partial BSSID corresponding to the bit does not belong to the partial BSSID of the SRG member, and when the value of a certain bit in the bitmap is 1, it is indicated that the partial BSSID corresponding to the bit belongs to the partial BSSID of the SRG member.

It may be understood that the SRG member indicated by the SRG BSS Color Bitmap field corresponds to the SRG member indicated by the SRG Partial BSSID Bitmap field.

Specifically, the current BSSID is a binary identifier with a length of 48 bits, of which 6 bits (bit 39 to bit 44 of the BSSID) are used to indicate the partial BSSID of the received HE PPDU. After receiving the HE PPDU, the STA analyzes the HE PPDU to obtain a current BSS color and a current BSSID, searches for a spatial reuse color set field according to the current BSS color, extracts a current partial BSSID from the current BSSID, searches for a spatial reuse address set field according to the current partial BSSID, determines that a BSS color collision occurs between the SRG member and the non-SRG member when the current BSS color information is recorded in the spatial reuse color set field and no current partial BSSID information is recorded in the spatial reuse address set field, and generates a collision report.

Illustratively, assuming that the current BSS color is 36 and the current partial BSSID is 22, the 36th bit of the spatial reuse color set field is queried according to the current BSS color, and the 22nd bit of the spatial reuse address set field is queried according to the current partial BSSID. When a value of the 36th bit of the spatial reuse color set field is 1 and a value of the 22nd bit of the spatial reuse address set field is 0, it is determined that a BSS color collision occurs between the SRG member and the non-SRG member, and a collision report is generated.

In an implementation mode, the wireless access point deletes the current BSS color information from the spatial reuse color set field according to the collision report, so as to correct the spatial reuse parameter field, the collision report is a report generated according to the current BSS color by the station.

Illustratively, with reference to a data format of the collision report as shown in FIG. 4, an event report frame of the collision report mainly includes six fields of element ID (1 byte), length (1 byte), event token (1 byte), event type (1 byte), event report status (1 byte), and event report (8 bytes). A numerical value of element ID is 79, indicating an event report element. A numerical value of length depends on the number of bytes of all other fields except element ID and length. A field value of event token is set as 0, indicating automatic reporting. A field value of event type is used for indicating a type of event report and may be set as other reserved values currently specified by the protocol, that is, all other unused values, for example, 6-220, 222-255, and the name may be SRG BSS color collision event report. The field of event report status is used for indicating a response of the STA to event request, as this embodiment is an automatic event report, the field is set as 0, indicating success. The field of event report includes a content specifically reported by the STA, the content contains BSS color information at which a BSS Color collision detected by the STA occurs between an SRG member and a non-SRG member, and specifically, the content includes: the field is 8 bytes long, each bit corresponds to a BSS color value, the value being 1 indicates that the STA detects that the BSS color collision occurs between the SRG member and the non-SRG member which correspond to the BSS color value, and the value being 0 indicates that the STA detects that no BSS color collision occurs between the SRG member and the non-SRG member which correspond to the BSS color value or a BSS corresponding to the BSS color value is the non-SRG member.

Illustratively, when a BSS color collision occurs, it is indicated that a non-SRG member uses the BSS color recorded in the spatial reuse color set field, thus, in order to avoid the non-SRG member being misidentified as an SRG member with its current BSS color, the spatial reuse color set field needs to be corrected. The spatial reuse color set field is set to be bitmap information recording colors used by the SRG member. The spatial reuse color set field is an 8-byte field having 64 bits in total, and each bit is used for indicating one color, that is, each bit of the bitmap corresponds to one of 64 BSS color values (0-63). When a BSS color collision occurs, the WAP directly sets the value of the bit corresponding to the current BSS color in the spatial reuse color set field as 0.

In an implementation mode, the spatial reuse parameter field is sent by the wireless access point.

It is worth explaining that the spatial reuse parameter field is generated and managed by the WAP, and after generating or correcting a spatial reuse field, the WAP sends the spatial reuse field to the STA in the BSS where the WAP is located, which is used by STA to determine the BSS color collision.

Figure 5:
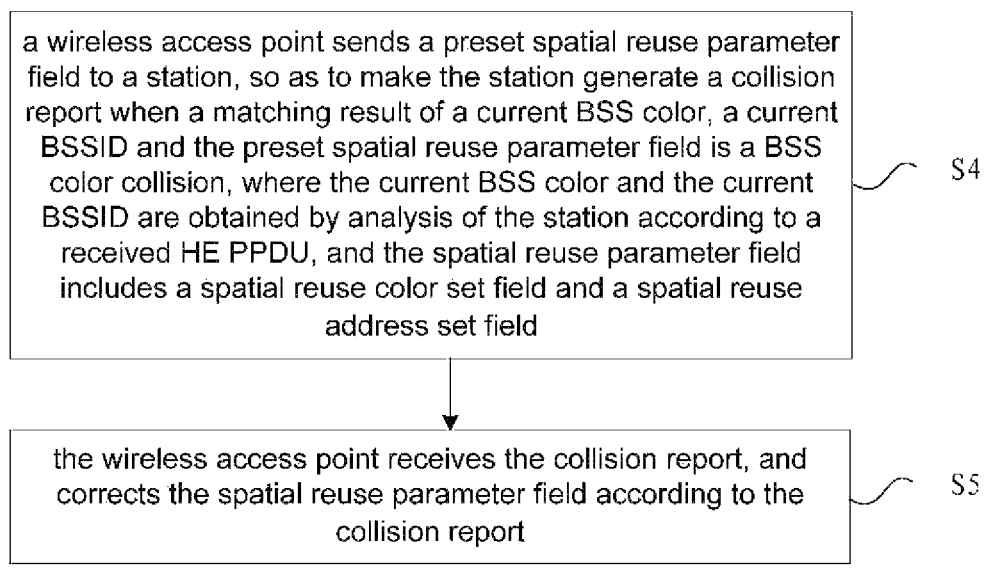
FIG. 5 is a flowchart of another method for processing a BSS color collision according to an embodiment of the present disclosure.

With reference to FIG. 5, an embodiment of the present disclosure provides another method for processing a BSS color collision. The method includes:

S4, a wireless access point sends a preset spatial reuse parameter field to a station, so as to make the station generate a collision report when a matching result of a current BSS color, a current BSSID and the preset spatial reuse parameter field is a BSS color collision, where the current BSS color and the current BSSID are obtained by analysis of the station according to a received HE PPDU, and the spatial reuse parameter field includes a spatial reuse color set field and a spatial reuse address set field; and S5, the wireless access point receives the collision report, and corrects the spatial reuse parameter field according to the collision report.

In an implementation mode, the matching result is the BSS color collision when one piece of BSS color information in the spatial reuse color set field matches the current BSS color and any piece of partial BSSID information in the spatial reuse address set field does not match the current BSSID; where the spatial reuse color set field includes the BSS color information of all SRG members, and the spatial reuse address set field includes the partial BSSID information of all SRG members.

In an implementation mode, the step that the wireless access point corrects the spatial reuse parameter field according to the collision report specifically includes:

the wireless access point deletes the current BSS color information from the spatial reuse color set field according to the collision report, the collision report is a report generated according to the current BSS color.

Specifically, an execution body of S3-S4 is a wireless access point (WAP). The WAP sends the preset spatial reuse parameter field to a station, the STA determines whether a BSS color collision occurs between an SRG and a non-SRG according to the current BSS color, the current BSSID and the spatial parameter field, and generates a collision report when the BSS color collision occurs, and the WAP corrects the spatial reuse parameter field according to the received collision report.

It is worth explaining that reference may be made to a working process of the above method for processing a BSS color collision according to the specific implementation for specific BSS color collision determination and BSS color collision resolution, which will not be repeated herein.

The method for processing a BSS color collision according to the embodiments of the present disclosure is used for a wireless access point. A spatial reuse parameter field is sent to a station, such that the station generates a collision report and sends the collision report to the wireless access point when a matching result of a current BSS color, a current BSSID and the spatial reuse parameter field is a BSS color collision, and the wireless access point corrects the spatial reuse parameter field according to the received collision report, so as to detect the BSS color collision and solve this collision, and further to avoid a reduction in performance of a wireless local area network.

Figure 6:
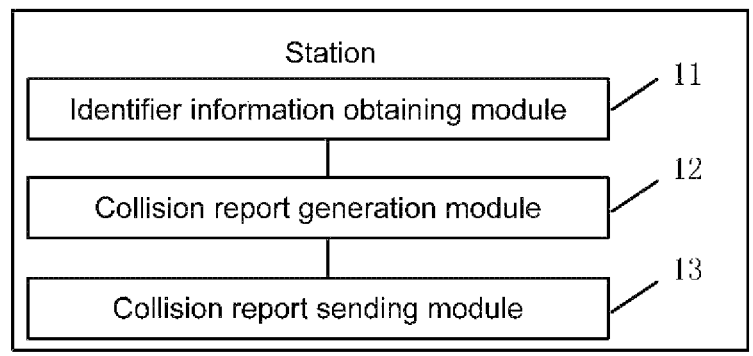
FIG. 6 is a schematic structural diagram of a station according to an embodiment of the present disclosure.

With reference to FIG. 6, an embodiment of the present disclosure provides a station. The station includes:

an identifier information obtaining module 11 configured to receive and analyze a HE PPDU to obtain a current BSS color and a current BSSID;

a collision report generation module 12 configured to generate a collision report when a matching result of the current BSS color, the current BSSID and a preset spatial reuse parameter field is a BSS color collision, where the spatial reuse parameter field includes a spatial reuse color set field and a spatial reuse address set field; and a collision report sending module 13 configured to send the collision report to a wireless access point, so as to make the wireless access point correct the spatial reuse parameter field.

It is worth explaining that reference may be made to a working process of the above method for processing a BSS color collision and used for a station (STA) according to the specific implementation for a specific working process of the STA, which will not be repeated herein.

Figure 7:
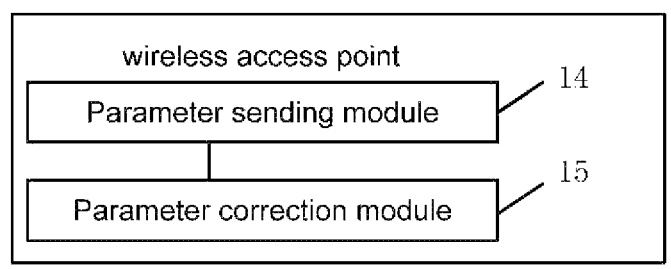
FIG. 7 is a schematic structural diagram of a wireless access point according to an embodiment of the present disclosure.

With reference to FIG. 7, an embodiment of the present disclosure provides a wireless access point. The wireless access point includes:

a parameter sending module 14 configured to send a preset spatial reuse parameter field to a station, so as to make the station generate a collision report when a matching result of a current BSS color, a current BSSID and the preset spatial reuse parameter field is a BSS color collision, where the current BSS color and the current BSSID are obtained by analysis of the station according to a received HE PPDU, and the spatial reuse parameter field includes a spatial reuse color set field and a spatial reuse address set field; and a parameter correction module 15 configured to receive the collision report and correct the spatial reuse parameter field according to the collision report.

It is worth explaining that reference may be made to a working process of the above method for processing a BSS color collision and used for the wireless access point (WAP) according to the specific implementation for a specific working process of the WAP.

Figure 8:
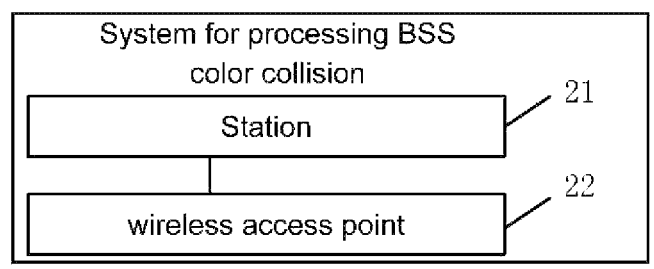
FIG. 8 is a schematic structural diagram of a system for processing a BSS color collision according to an embodiment of the present disclosure.

With reference to FIG. 8, an embodiment of the present disclosure provides a system for processing a BSS color collision. The system includes a station 21 and a wireless access point 22, where the station 21 is a station as described in FIG. 6 and the wireless access point 22 is a wireless access point as described in FIG. 7.

Specifically, a method for processing a BSS color collision by the system includes: the station 21 analyzes an obtained HE PPDU to obtain a current BSS color and a current BSSID, the wireless access point 22 sends a preset spatial reuse parameter field to the station 21, the station 21 determines whether a BSS color collision occurs between an SRG member and a non-SRG member according to the current BSS color, the current BSSID and the spatial reuse parameter field, and when the BSS color collision occurs, the station 21 generates and sends a collision report to the wireless access point 22, and the wireless access point 22 corrects the spatial reuse parameter field according to the received collision report.

According to the station, the wireless access point and the system for processing a BSS color collision provided by the present disclosure, firstly, an obtained HE PPDU is analyzed by the station to obtain a current BSS color and a current BSSID, when a matching result of a spatial reuse parameter field, the current BSS color and the BSSID is a BSS color collision, a collision report is generated by the station and sent to the wireless access point, and finally, the wireless access point corrects the spatial reuse parameter field according to the collision report, so as to detect the BSS color collision and solve the BSS color collision, and further to avoid a reduction in performance of a wireless local area network.

Those of ordinary skill in the art may understand that all or some procedures in the methods in the embodiments may be implemented by a computer program instructing related hardware. The program may be stored in one computer-readable storage medium, and when executed, the program can include the processes in embodiments of the method above. The storage medium may be a magnetic disk, an optical disk, a read-only memory (ROM), a random access memory (RAM), etc.

The foregoing is preferred implementation modes of the present disclosure, and it should be noted that several improvements and modifications may also be made by those of ordinary skill in the art without departing from the principles of the present disclosure and should also be considered to fall within the scope of protection of the present disclosure.

What is claimed is:

1. A method for processing a basic service set (BSS) color collision, comprising:

receiving and analyzing, by a station, a high efficiency physical layer protocol data unit (HE PPDU) to obtain a current BSS color and a current BSS identifier (BSSID);

in a case that a matching result of the current BSS color, the current BSSID and a preset spatial reuse parameter field is a BSS color collision, generating, by the station, a collision report wherein the spatial reuse parameter field comprises a spatial reuse color set field and a spatial reuse address set field; and sending, by the station, the collision report to a wireless access point so as to make the wireless access point correct the spatial reuse parameter field, wherein the wireless access point deletes the current BSS color information from the spatial reuse color set field according to the collision report, so as to correct the spatial reuse parameter field, the collision report is a report generated according to the current BSS color by the station.

2. The method for processing the BSS color collision as claimed in claim 1, wherein in a case that the matching result of the current BSS color, the current BSSID and the preset spatial reuse parameter field is the BSS color collision, the step of generating, by the station, the collision report comprises:

in a case that one piece of BSS color information in the spatial reuse color set field matches the current BSS Color, and any piece of partial BSSID information in the spatial reuse address set field does not match the current BSSID, determining, by the station, that the BSS color collision occurs between a spatial reuse group (SRG) member and a non-spatial reuse group (non-SRG) member, and generating the collision report; wherein the spatial reuse color set field comprises the BSS color information of all the SRG members, and the spatial reuse address set field comprises the partial BSSID information of all the SRG members.

3. The method for processing the BSS color collision as claimed in claim 1, wherein the spatial reuse parameter field is sent by the wireless access point.

4. A method for processing the BSS color collision, comprising:

sending a preset spatial reuse parameter field to a station by a wireless access point, so as to make the station generate a collision report in a case that a matching result of a current BSS color, a current BSSID and the preset spatial reuse parameter field is a BSS color collision, wherein the current BSS color and the current BSSID are obtained by analysis of the station according to a received HE PPDU, and the spatial reuse parameter field comprises a spatial reuse color set field and a spatial reuse address set field; and receiving the collision report by the wireless access point, and correcting the spatial reuse parameter field according to the collision report, wherein correcting the spatial reuse parameter field according to the collision report comprises:

deleting the current BSS color information from the spatial reuse color set field according to the collision report by the wireless access point, the collision report being a report generated according to the current BSS color.

5. The method for processing the BSS color collision as claimed in claim 4, wherein the matching result is the BSS color collision in a case that one piece of BSS color information in the spatial reuse color set field matches the current BSS color and any piece of partial BSSID information in the spatial reuse address set field does not match the current BSSID; wherein the spatial reuse color set field comprises the BSS color information of all SRG members, and the spatial reuse address set field comprises the partial BSSID information of all SRG members.

6. A system for processing a BSS color collision, comprising a station and a wireless access point, wherein, the station comprises:

an identifier information obtaining module configured to receive and analyze a HE PPDU to obtain a current BSS color and a current BSSID;

a collision report generation module configured to generate a collision report in a case that a matching result of the current BSS color, the current BSSID and a preset spatial reuse parameter field is a BSS color collision, wherein the spatial reuse parameter field comprises a spatial reuse color set field and a spatial reuse address set field; and a collision report sending module configured to send the collision report to a wireless access point, so as to make the wireless access point correct the spatial reuse parameter field, wherein, the wireless access point deletes the current BSS color information from the spatial reuse color set field according to the collision report, so as to correct the spatial reuse parameter field, the collision report is a report generated according to the current BSS color by the station, wherein, the wireless access point comprises:

a parameter sending module configured to send the preset spatial reuse parameter field to the station, so as to make the station generate the collision report in a case that a matching result of the current BSS color, the current BSSID and the preset spatial reuse parameter field is the BSS color collision, wherein the current BSS color and the current BSSID are obtained by analysis of the station according to the HE PPDU received, and the spatial reuse parameter field comprises the spatial reuse color set field and the spatial reuse address set field; and a parameter correction module configured to receive the collision report and correct the spatial reuse parameter field according to the collision report, wherein, the parameter correction module specifically configured to: deleting the current BSS color information from the spatial reuse color set field according to the collision report, the collision report being a report generated according to the current BSS color.

* * * * *